United States Patent [19]

Toch

[11] Patent Number: 4,599,535

[45] Date of Patent: Jul. 8, 1986

[54] DISPLAY TUBE OUTPUT ASSEMBLY AND METHOD OF MANUFACTURE

[75] Inventor: Peter L. Toch, Randolph, Mass.

[73] Assignee: Raytheon Company, Lexington, Mass.

[21] Appl. No.: 364,746

[22] Filed: Apr. 2, 1982

[51] Int. Cl.[4] .......................... H01J 29/89; H01J 9/26; H04N 5/72

[52] U.S. Cl. .................................... 313/478; 358/253; 445/45

[58] Field of Search ............... 313/474, 478, 479, 371; 350/318; 358/253, 247; 445/8, 22, 44, 45

[56] References Cited

U.S. PATENT DOCUMENTS

| | | | |
|---|---|---|---|
| 2,918,670 | 12/1959 | Cusano et al. | 313/474 X |
| 3,879,627 | 4/1975 | Robinder | 313/112 |
| 3,909,524 | 9/1975 | Ohkoski et al. | 358/247 |
| 4,031,553 | 6/1977 | Sumiyoshi et al. | 358/247 |
| 4,245,242 | 1/1981 | Trcka | 358/253 X |

FOREIGN PATENT DOCUMENTS

| | | | |
|---|---|---|---|
| 51114265 | 9/1981 | Japan | 313/371 |

*Primary Examiner*—Palmer C. DeMeo
*Assistant Examiner*—Sandra L. O'Shea
*Attorney, Agent, or Firm*—John T. Meaney; R. M. Sharkansky

[57] ABSTRACT

An image display device having an image transmissive faceplate with an exterior surface spaced from a light filtering layer of uniform thickness on a protective transparent panel by an encircling sealed gasket to form an interposed cavity which is filled with image transmissive bonding material. A method comprising the steps of (1) casting an annular gasket in encircling sealed relationship with an implosion panel, (2) depositing within the annular gasket and on the encircled panel a uniform thickness layer of light-filtering material, (3) sealing the gasket to an outer marginal portion of a display tube faceplate to form a cavity between the faceplate and the layer of light-filtering material on the implosion panel, and (4) filling the cavity with light transmissive bonding material.

10 Claims, 5 Drawing Figures

FIG. 1
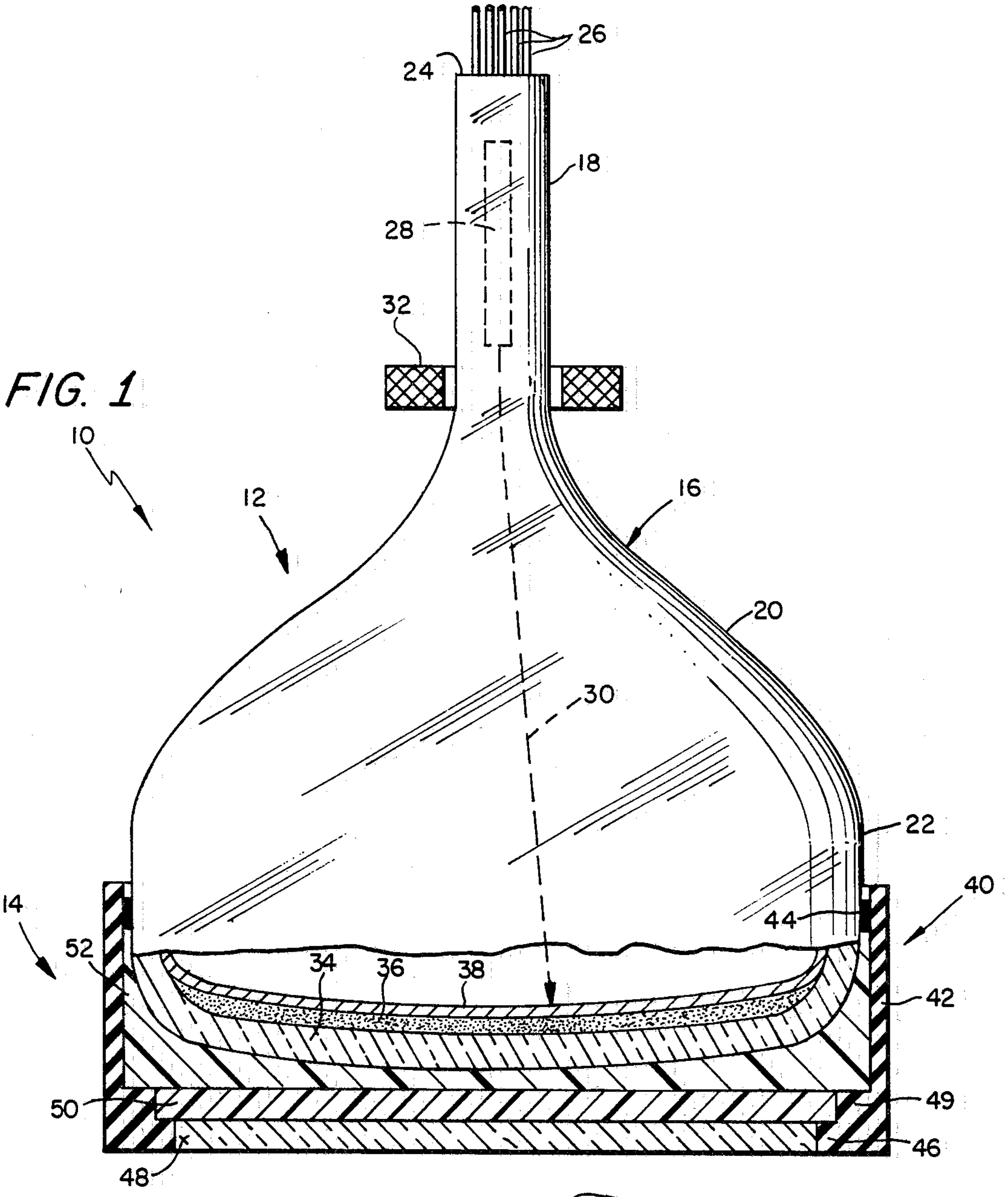
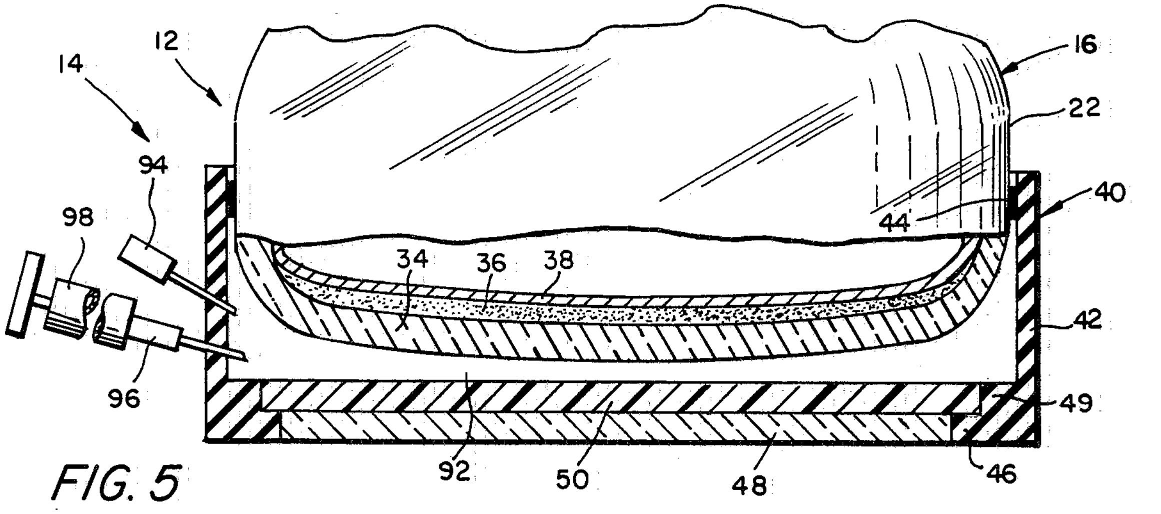
FIG. 5

DISPLAY TUBE OUTPUT ASSEMBLY AND METHOD OF MANUFACTURE

BACKGROUND OF THE INVENTION

1. Field of the Invention

This invention relates generally to image display devices and is concerned more particularly with a device having light emitting means disposed for displaying an image.

2. Discussion of the Prior Art

An image display tube may be of the cathode ray type having a generally funnel-shaped envelope terminating at its larger end in an image transmissive, output faceplate. Disposed adjacent the inner surface of the output faceplate is an aligned imaging screen comprising a layer of phosphor material which fluoresces locally when a discrete region thereof is penetrated by beamed electrons. As a result, the discrete region emits light with an intensity or brightness corresponding to the energies expended by the penetrating electrons.

In operation, an electron beam is directed onto the inner surface of the imaging screen and deflected laterally over it to move into alignment with respective discrete regions of the phosphor material. Also, the instantaneous value of the electron current in the beam is varied to cause the respective discrete regions of the phosphor material to emit light with varying intensity. As a result, the imaging screen produces a visible light image having discrete areas of varying light intensity aligned with the respective discrete regions of the phosphor material penetrated by electrons. The visible light image, thus produced, is directed through the output faceplate to emerge from the tube for external viewing.

The visible light image transmitted through the output faceplate also may be required to pass through a light transmissive implosion panel which generally is bonded to the exterior surface of the output faceplate. For safety purposes, the implosion panel usually is relatively thick, such as one-eighth of an inch, for example. In practice it may be found that the implosion panel and the output faceplate permit ambient light to enter the tube and impinge on the imaging screen. As a result, the entire phosphor layer of the imaging screen may scatter a background light which degrades contrast in the visible light image produced for external viewing. Consequently, image display tubes of the prior art may be provided with an output assembly for supporting a layer of light-filtering material in alignment with the exterior surface of the output faceplate. The material of this light-filtering layer readily transmits light of the color or wavelength produced by the phosphor material of the imaging screen and selectively absorbs light of other colors or wavelengths, thereby enhancing contrast in the image produced for external viewing.

The output assembly for supporting the light-filtering layer usually comprises a sandwich of two implosion panels having the light-filtering layer between them. It is generally held that the two implosion panels are necessary to provide the interposed layer of light-filtering material with smooth surfaces and a substantially uniform thickness so that the integrity of shading in the image is not disturbed or distorted by irregularities in the light-filtering material. Thus, due to the thicknesses of the implosion panels, the light-filtering sandwich of implosion panels increases the weight of the tube significantly. Furthermore, because space in front of the output faceplate is limited in some installations, the implosion panel sandwich generally is required to have a curvature conforming to the curvature of the output faceplate of the tube and is bonded directly to the exterior surface of the output faceplate. However, the two implosion panels may not be readily available for forming a sandwich with the proper curvature and having the desired image transmitting properties.

SUMMARY OF THE INVENTION

Accordingly, these and other disadvantages are overcome by this invention providing an image display device having an output portion with a light-filtering output assembly comprised of a single implosion panel which need not have a contour conforming to the output portion of the device.

The image display device, for example, may comprise an image display tube of the cathode ray type having an envelope including an image transmissive, output faceplate provided with an outwardly curved contour. The output assembly of this invention may comprise, for example, a substantially flat implosion panel of transparent material. Molded to the rim of the implosion panel is one end portion of an annular gasket having an opposing larger end portion and an intermediate stepped portion. In the cup-like recess formed by the implosion panel and intermediate stepped portion of the gasket there is disposed a uniform thickness layer of light-filtering material which selectively transmits light of the color or wavelength produced by the device. The opposing larger end portion of the gasket is sealed to a peripheral portion of the device surrounding the outwardly curved faceplate to form an interposed cavity which is filled with a clear bonding material.

Thus, this invention also includes the method comprising the steps of (1) molding the annular gasket to the rim of the implosion panel, (2) depositing a uniform thickness layer of light-filtering material in the cup-like recess formed by the implosion panel and the annular gasket, (3) sealing the gasket to an output member of an image display device to form an interposed cavity, and (4) filling the interposed cavity with a clear bonding material.

BRIEF DESCRIPTION OF THE DRAWINGS

For a better understanding of the invention, reference is made in the following detailed description to the accompanying drawings wherein:

FIG. 1 is an elevational view, partly in section, of an image display device embodying the invention;

FIG. 5 is a fragmentary axial sectional view showing the annular gasket bonded to the output faceplate of the display device.

DESCRIPTION OF THE PREFERRED EMBODIMENT

Figure 2:
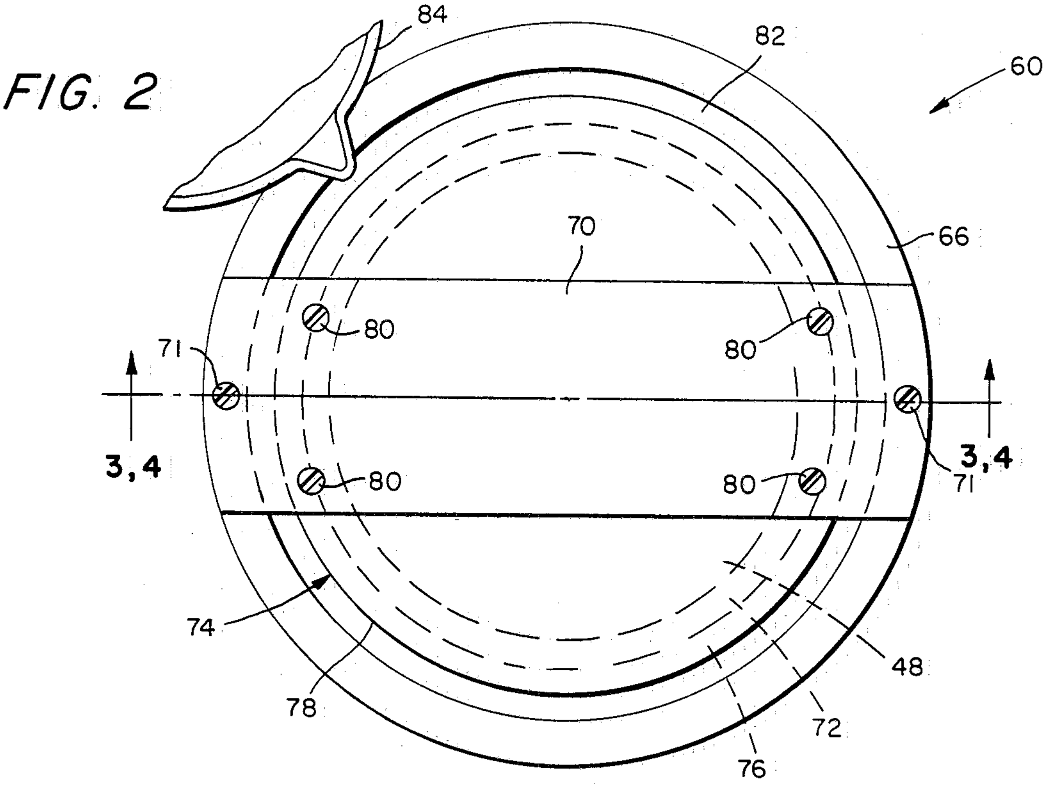
FIG. 2 is a plan view of a molding fixture used for practicing the method of this invention.

Referring to the drawings wherein like characters of reference designate like parts, there is shown in FIG. 1 an image display unit 10 comprising an image display tube 12 provided with an external output assembly 14. The display tube 12 may be of the cathode ray type having an evacuated envelope 16 of generally funnel-shaped configuration. Envelope 16 includes a neck-end portion 18 integrally joined through an outwardly flared portion 20 to a larger end portion 22. The neck-end portion 18 terminates at the smaller end of envelope 16 in a peripherally sealed stem press 24 having extended hermetically through it an array of insulatingly spaced terminal pins 26.

Axially disposed within the neck-end portion 18 of envelope 16 is a conventional electron gun 28 comprising an axially aligned series of mutually spaced electrodes (not shown). The electrodes of gun 28 are electrically connected to respective terminal pins 26 for producing an electron beam 30 which is directed into the larger end portion 22 of envelope 16 and has an instantaneously varying electron intensity. The electron beam 30 is deflected laterally with respect to its axial direction by conventional means, such as an electromagnetic yoke coil 32 encircling the neck-end portion 18 of envelope 16 adjacent the exit end of gun 28, for example.

The larger end portion 22 of envelope 16 terminates in a transversely disposed, output faceplate 34 which is made of image transmissive material, such as glass, for example. Output faceplate 34 may be curved outwardly of envelope 16 in a generally spherical manner and has disposed on its inner surface an anode imaging screen layer 36 of phosphor material, such as zinc sulfide, for example, which is locally sensitive to impinging electrons. Disposed on the inner surface of imaging screen layer 36 is a light reflective coating 38 of electrically conductive material, such as aluminum, for example, which serves as the anode electrode of tube 12.

In operation, the coating 38 is maintained at a relatively high positive electrical potential with respect to the electrodes of gun 28 to focus the electron beam 30 onto a small spot area of imaging screen layer 36. As a result, electrons from the beam 30 penetrate into the aligned discrete region of the layer 36 to cause it to fluoresce locally and emit light with a brightness corresponding to the intensity of the impinging electrons. Also, the electromagnetic yoke coil 32 is connected electrically to beam deflection means (not shown) for moving the beam 30 laterally into alignment with respective discrete regions of the imaging screen layer 36 while the instantaneous electron intensity of beam 30 is varying. Consequently, the imaging screen layer 36 produces a visible light image having discrete areas of respective brightness generated in accordance with the instantaneously varying intensity of electron beam 30. This visible light image produced by layer 36 is reflected by the coating 38 in the direction of output faceplate 34 where it is transmitted externally of envelope 16 for viewing purposes.

In axial projection, the output faceplate 34 and the output assembly 14 may have similar configurations, such as circular or rectangular, for examples. The output assembly 14 includes a peripheral gasket 40 made of opaque resilient material, such as silicone rubber, for example, and having adjacent the tube 12 an end portion 42 which is similar in size to the end portion 22 of envelope 16. End portion 42 of gasket 40 is sealed, as by an interposed band 44 of adhesive bonding material, for example, to an annular portion of envelope 16 adjacent the outer periphery of faceplate 34. The gasket 40 has an opposing end portion 46 provided with an inwardly extending annular flange which is sealed, as by molding, for example, to a rim of an implosion panel 48.

The implosion panel 48 is made of light-transparent material, such as glass, for example, and supports on its inner surface a layer 50 having an outer periphery defined by an annular stepped portion 49 of gasket 40. Layer 50 is made of light-filtering material, such as dyed resin material, for example, which selectively transmits the color or wavelength of light, such as green light, for example, produced by the imaging screen layer 36, and absorbs other colors or wavelengths of light. Thus, the light-filtering layer 50 of output assembly 14 restricts the passage of ambient light inwardly of faceplate 34 thereby preserving contrast in the visible light image produced by imaging screen layer 36.

The light-filtering layer 50 is supported by the implosion panel 48 and gasket 40 in spaced relationship with the exterior surface of faceplate 34 to form, in conjunction with the encircling end portion 42 of gasket 40, an interposed cavity which is filled with a body 52 of light-transparent material such as clear resin material, for example. Accordingly, since the body 52, the light-filtering layer 50, and the implosion panel 48 are all transparent to the visible light image produced by imaging screen layer 36, the implosion panel 48 need not conform in curvature to the faceplate 34. Consequently, even though the faceplate 34 has a generally spherical curvature, the implosion panel 48 may be substantially flat or planar without having adverse or distorting effects on the visible light image transmitted through the faceplate 34 for external viewing purposes.

Figure 3:
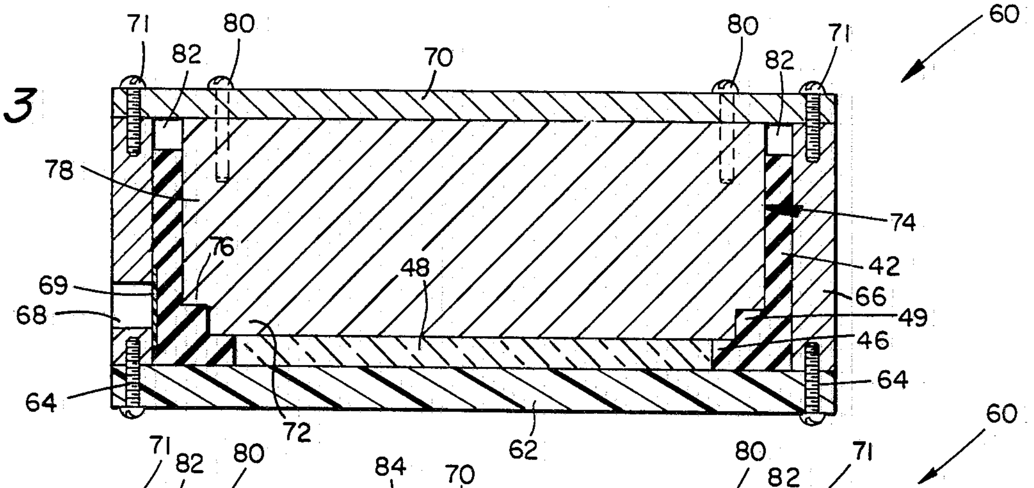
FIG. 3 is an axial sectional view of the molding fixture shown in FIG. 2 disposed for molding an annular gasket to the rim of an implosion panel.

As shown in FIGS. 2 and 3, the output assembly 14 may be fabricated with the aid of a molding fixture 60 which is illustrated, in plan view, as having a generally circular configuration. However, it is to be understood that the fixture 60 could be illustrated, in plan view, as having an alternative configuration, such as rectangular, for example. The fixture 60 includes a bottom plate 62 made of a rigid material, such as synthetic resin, for example, which preferably is transparent for visual inspection purposes. An outer marginal portion of plate 62 is tightly secured, as by screws 64, for example, to an end surface of an upright tubular wall 66 made of rigid material, such as steel, for example. For reasons that will become apparent, the wall 66 preferably is provided with a radially extending through-hole 68 having an inner end covered by suitable means, such as plastic tape 69, for example. Secured to the upper end surface of wall 66, as by screws 71, for example, are respective end portions of a relatively wide bar 70 which extends across an open end of fixture 60 and is made of rigid material, such as steel, for example.

Initially, the bar 70 is removed from fixture 60 and the inner surface areas of wall 66 and bottom plate 62 are provided with a thin coating of mold release material, such as polytetrafluoroethylene, for example. The implosion panel 48 is placed in interfacing relationship with the inner surface of bottom plate 62 and is centered with respect to the wall 66 by convenient means, such as template marks (not shown) scribed or painted on the transparent plate 62, for example. Superimposed on the inner surface of implosion panel 48 is an undercut end portion 72 of a core 74 which is made of rigid material, such as steel, for example, and is provided with a thin coating of mold release material. The end portion 72 of core 74 is integrally joined through an outwardly extending annular shoulder 76 to a larger diameter end portion 78 secured to bar 70, as by screws 80, for example. Bar 70 is disposed across the open end of fixture 60 and has its opposing end portions secured to the upper end surface of wall 66 thereby centering the core 74 with respect to the tubular wall 66.

As a result, the core 74 and the implosion panel 48 form with the encircling portions of bottom plate 62 and tubular wall 66 an interposed annular cavity 82 having the configuration of stepped gasket 40. Uncured gasket-forming material, such as, for example, a silicone rubber is poured, as from container 84, for example, into the open end of annular cavity 82 until it is filled to a desired level, such as to a specified level mark (not shown) on the inner surface of wall 66, for example. When cured, the silicone rubber material forms the annular stepped gasket 40 having a flanged end portion sealed by molding to the rim of implosion panel 48. The bar 70 and attached core 74 then are removed from the fixture 60.

Figure 4:
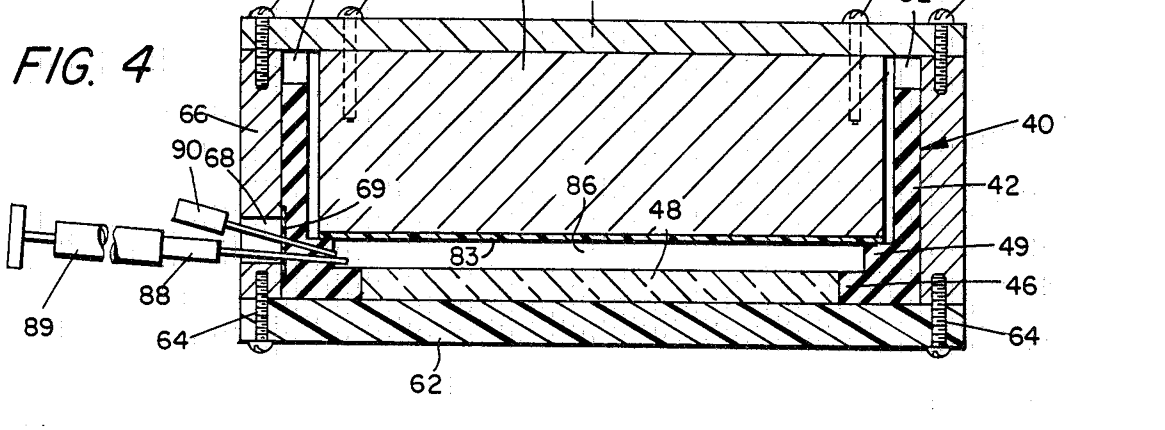
FIG. 4 is an axial sectional view of the molding fixture shown in FIG. 3 but modified for depositing a light-filtering layer on the inner surface of the implosion panel.

In the next stage of fabrication, as shown in FIG. 4, the midportion of bar 70 is attached, as by screws 80, for example, to one end of uniform cylindrical core 84 having an opposing end surface protected with a thin layer 83 of mold release material. The core 84 has a cross-sectional size which is substantially less than the opening defined by larger diameter end portion 42 of gasket 40 but greater than the opening defined by the stepped portion 49 of gasket 40. Also, the core 84 is provided with a height or altitude which is slightly greater, such as five thousandths of an inch greater, for example, than the distance between the open end of wall 66 and the stepped portion 49 of gasket 40 in fixture 60. Consequently, when the core 84 is inserted into the larger end portion 42 of gasket 40 and the respective end portions of bar 70 are secured by screws 71 to the open end of wall 66, the release protected end surface of core 84 compresses the stepped portion 52 of gasket 40 slightly to form with the implosion panel 48 an interposed wafer-like cavity 86.

Two hypodermic needles, 88 and 90, are inserted into the through-hole 68 and pushed through the tape 69 as well as through the resilient material of gasket 40 to enter the cavity 86. Hypodermic needle 88 is attached to a syringe 89 having therein a light-filtering material, such as dyed resin material, for example, in liquid form. The plunger of syringe 89 is actuated to inject the light-filtering liquid material into cavity 86 while the air in cavity 86 is vented through the hypodermic needle 90. This stage of fabrication may be carried out by disposing the syringe 89 as the uppermost element of the structure and having gravity acting on the injected light-filtering material to fill the cavity 86. Also, the transparent materials of plate 62 and implosion panel 48 may be used to observe the flow of light-filtering material within cavity 86 and to inspect for any air bubbles in the injected light-filtering material. When the cavity 86 is filled, the respective needles 88 and 90 are removed to permit the resilient material of gasket 40 to re-seal the cavity 86. When the material injected into cavity 86 is cured, there is formed on the inner surface of implosion panel 48 the light-filtering layer 50 having the required uniform thickness and smoothness for selectively transmitting the visible light image produced by imaging screen layer 36 without distortion. After removing bar 70, the core 84, and the release layer 83 are readily withdrawn from fixture 60 to leave the layer 50 with a smooth inner surface. Subsequently, the sub-assembly comprising gasket 40, implosion panel 48 and light filtering layer 50 is removed from the fixture 60.

In a subsequent stage of manufacture, as shown in FIG. 5, the end portion 42 of gasket 40 is sealed by means of the annular band 44 of adhesive material to a peripheral portion of envelope 16 surrounding the faceplate 34. As a result, the implosion panel 48 is mounted over the faceplate 34; and the light filtering layer 50 on the inner surface of panel 48 is disposed in predetermined spaced relationship with the exterior surface of faceplate 34. Thus, there is formed between the light-filtering layer 50 and the faceplate 34 a cavity 92 having an outer periphery defined by the encircling end portion 42 of gasket 40. Pushed through the resilient material of gasket 40 are respective hypodermic needles 94 and 96, the needle 96, having attached to it a syringe 98 having therein a clear resin material in liquid form. Accordingly, the plunger of syringe 98 is pressed to inject into cavity 92 the uncured clear resin material while air in the cavity 92 is vented through the needle 94. Here again the syringe 96 may be disposed as the uppermost element of the structure and gravity employed for filling the cavity 92 with the injected clear resin material. When the cavity 92 is filled, the needles 94 and 96 are withdrawn to permit the resilient material of gasket 40 to re-seal the cavity. Consequently, after curing, the clear resin material forms a body 52 of light-transparent bonding material between the output faceplate 34 and the light-filtering layer 50 of output assembly 14.

Thus, there has been disclosed herein means for providing the display tube 12 with an output assembly 14 comprising a single implosion panel 48 supporting a uniform thickness layer 50 of light-filtering material in a spacesaving manner with the output faceplate 34 of tube 12. Also, there has been disclosed herein a method of manufacture comprising the steps of (1) bonding one end portion of a resilient tubular gasket 40 to a rim of an implosion panel 48, (2) disposing a light-filtering layer of substantially uniform thickness on the inner surface of the panel 48 encircled by the gasket 40, (3) bonding the other end portion of the tubular gasket to an outer peripheral portion of an image display device, and (4) disposing a body of image transmissive material between the image display device and the light-filtering layer on the inner surface of the implosion panel.

From the foregoing, it will be apparent that all of the objectives of this invention have been achieved by the structures and methods described herein. It also will be apparent, however, that various changes may be made by those skilled in the art without departing from the spirit of the invention as expressed in the appended claims. It is to be understood, therefore, that all matter shown and described is to be interpreted as illustrative and not in a limiting sense.

What is claimed is:

1. An image display device comprising:

image producing means including an output surface having a first contour for producing an image and directing said image through said output surface;

image transmissive means aligned with said output surface for transmitting said image, said image transmissive means including a single rigid panel having a second contour different from said first contour and filter means disposed between said output surface and said rigid panel for selectively transmitting said image directed through said output surface; and tubular means for supporting said image transmissive means in alignment with said output surface, said tubular means having one end portion secured about said output surface, an opposing end portion secured about said rigid panel and an intermediate stepped portion secured about said filter means.

2. An image display device as set forth in claim 1 wherein said filter means comprises a uniform thickness layer of light filtering material disposed on said panel in spaced opposing relationship with said output surface of the image producing means.

3. An image display device as set forth in claim 2 wherein said image transmissive means includes a body of image transmissive bonding material disposed between said output surface and said layer of light filtering material, said body having a first bonding surface conforming to said first contour of the output surface and having a second bonding surface conforming to said second contour of the panel.

4. An image display device comprising:

image producing means including an output portion for producing an image and directing said image through said output portion;

output assembly means disposed in alignment with said output portion for transmitting said image, the output assembly means including an image transmissive panel spaced from said output portion, filter means supported between said output portion and said panel for selectively transmitting said image from said output portion, and a tubular member having one end portion peripherally sealed to said panel, an opposing end portion peripherally sealed to said output portion of the image producing means and an intermediate stepped portion peripherally contacting said filter means.

5. An image display device as set forth in claim 4 wherein said output assembly means includes an image transmissive body of bonding material disposed between said panel and said output portion, and encircled by said tubular member.

6. An image display device as set forth in claim 5 wherein said end portion peripherally sealed to said panel comprises a flanged end portion extended radially inward of said tubular member.

7. An image display device as set forth in claim 6 wherein said intermediate stepped portion extends radially inward of said tubular member and extends axially from said flanged end portion thereof, and said filter means comprises a uniform thickness layer of light filtering material disposed on said panel and encircled by said intermediate stepped portion of said tubular member.

8. A method for providing an output portion of an image display device with an image transmissive output assembly and comprising the steps of:

moldably sealing a flanged end portion of a tubular resilient member to a peripheral portion of an image transmissive panel while moldably forming an internally stepped portion of said tubular resilient member in axially extending relationship with said flanged end portion;

moldably forming a light-filtering member on the inner surface of said panel and within said internally stepped portion; and sealing an opposing end portion of the tubular resilient member to the output portion of the image display device.

9. A method as set forth in claim 8 and including the additional step of injecting image transmissive bonding material in liquid form between said light-filtering member and said output portion.

10. A method as set forth in claim 9 and including the additional step of curing said bonding material to form a solid body of material bonded to said light-filtering member and said output portion.

* * * * *